US008757582B2

(12) United States Patent
Robinson

(10) Patent No.: US 8,757,582 B2
(45) Date of Patent: Jun. 24, 2014

(54) VALVE ASSEMBLY

(75) Inventor: Randy Donald Robinson, Kingsville, MO (US)

(73) Assignee: Knappco Corporation, Kansas City, MO (US)

( * ) Notice: Subject to any disclaimer, the term of this patent is extended or adjusted under 35 U.S.C. 154(b) by 37 days.

(21) Appl. No.: 13/608,508

(22) Filed: Sep. 10, 2012

(65) Prior Publication Data
US 2014/0070126 A1 Mar. 13, 2014

(51) Int. Cl.
*F16K 31/12* (2006.01)
(52) U.S. Cl.
USPC .............................................. 251/28; 251/25
(58) Field of Classification Search
USPC .............................................. 251/28, 25, 54
See application file for complete search history.

(56) References Cited

U.S. PATENT DOCUMENTS

| 792,757 | A |  | 6/1905 | Cloos |  |
|---|---|---|---|---|---|
| 793,698 | A | * | 7/1905 | Walter | 137/630.14 |
| 2,520,216 | A | * | 8/1950 | Kounovsky et al. | 236/80 R |
| 2,869,500 | A | * | 1/1959 | Svenson | 114/183 R |
| 3,102,553 | A | * | 9/1963 | Ottestad | 137/509 |
| 3,556,463 | A | * | 1/1971 | Williams | 251/14 |
| 3,712,578 | A | * | 1/1973 | Dawson | 251/35 |
| 3,987,818 | A | * | 10/1976 | Williams | 137/630.13 |
| 4,763,688 | A |  | 8/1988 | Morris |  |
| 5,249,775 | A |  | 10/1993 | Tabatabai |  |
| 5,275,202 | A |  | 1/1994 | VanDeByvere |  |
| 5,848,608 | A |  | 12/1998 | Ishigaki |  |
| 6,454,237 | B1 |  | 9/2002 | VanDeByvere |  |
| 7,748,401 | B2 | * | 7/2010 | Zecchi et al. | 137/315.05 |
| 8,267,110 | B2 | * | 9/2012 | Zecchi et al. | 137/15.18 |
| 8,322,359 | B2 | * | 12/2012 | Zecchi et al. | 137/15.18 |
| 2003/0218146 | A1 | * | 11/2003 | Simoens | 251/25 |

OTHER PUBLICATIONS

T195SV Vapor Recovery Vent, CIVACON, 4304 Mattox Road, Kansas City, MO 64150; www.civacon.com; Rev. A, Mar. 2011.

* cited by examiner

*Primary Examiner* — John K Fristoe, Jr.
*Assistant Examiner* — Umashankar Venkatesan
(74) *Attorney, Agent, or Firm* — Spencer Fane Britt & Browne LLP

(57) ABSTRACT

A valve assembly for sealing a port of a housing includes a primary sealing member and a secondary sealing member mounted to a valve body. Valve body includes a lower body with an upper portion depending from the body having a cross sectional diameter less than the upper body, and a lower portion depending from the upper portion having a cross sectional diameter less than the upper portion. The primary member includes apertures and is slidably mounted to the upper portion, and the secondary member is mounted to the lower portion. In a closed position the secondary member seals against the primary member, and the primary member seals against the port. Downward movement of the valve body unseals the secondary member from the primary member allowing venting through the apertures, and then unseals the primary sealing member from the port allowing full venting through the housing.

17 Claims, 8 Drawing Sheets

VALVE ASSEMBLY

BACKGROUND

The present disclosed subject matter relates generally to valve assemblies, and in particular to a two stage air operated valve assembly.

Sealed containers, such as tank trailers, allow for the storage and transportation of solid and liquid materials. Vapors generated by material within a sealed container, such as vapor generated by a liquid, create pressure on the container walls and any sealed outlets communicating with the interior of the container. It is often desirable to allow the vapor to accumulate within the sealed container until the material is transferred from the container or until the vapor can be safely vented. The accumulated vapor can generate pressure within the tank making it difficult to transfer material into or out of the container. Valves connected to an outlet of the container provide a seal for preventing movement of the vapor out of the container until it is desired to transfer material from the container or vent the vapor from the container. The seal is provided by a sealing mechanism covering the outlet. However, high pressures within the container can create forces that act on the seal and exceed the force available to open the seal, thereby preventing the valve from opening and the container from venting.

SUMMARY

A valve assembly for sealing the port of a tubular housing includes a primary sealing member and a secondary sealing member. The valve assembly and housing may be used to seal the port of a container that has an internal tank pressure created by the accumulation of vapor.

A tubular valve stem disposed within the housing slidably receives the upper body of a tubular valve body. The primary and secondary sealing members are connected to the lower body of a valve body. The lower body includes an upper portion extending downward from the upper body and has a cross sectional diameter less than the upper body, and a lower portion extends downward from the upper portion and has a cross sectional diameter less than the upper portion.

The primary sealing member has a disk-shaped body with an upper surface and a lower surface. A centrally located passage extends between the upper surface and lower surface for slidably mounting the primary sealing member to the upper portion. An annular seal at the upper surface of the primary sealing member creates a sealing relationship between the housing port and the primary sealing member. The primary sealing member includes one or more apertures that extend between the upper surface and lower surface, and are disposed between the external passage and the annular seal. A secondary sealing member has a centrally located passage for mounting the secondary sealing member to the lower portion. A seal at the upper surface of the secondary sealing member creates a sealing relationship between the primary sealing member and the secondary sealing member whereby the apertures at the lower surface of the primary sealing member are between the passage in the secondary sealing member and the seal in the secondary sealing member when the secondary sealing member creates a sealing relationship with the primary sealing member.

A spring guide secured to the top of the upper valve body allows a helical spring retained within the valve stem to bias the valve body upward causing the secondary sealing member to create a sealing relationship with the first sealing member, and the first sealing member to create a sealing relationship with the port of the housing.

A piston disposed within the valve stem moves downward when air is forced into the valve stem above the piston. The piston moves the valve body downward, biasing the spring downward, and sequentially moving first the secondary sealing member downward and away from the primary sealing member to break the sealing relationship therebetween, followed by moving the primary sealing member downward and away from the housing port to break the sealing relationship therebetween. Sequential opening of the valve assembly allows the secondary sealing member to open first against high tank pressure to allow initial venting of the vapor from within the container through one or more apertures in the primary sealing member. After the initial venting, the internal tank pressure has been lowered allowing the primary sealing member to open and allow full venting of the container through the housing.

BRIEF DESCRIPTION OF THE DRAWINGS

The drawings constitute a part of this specification and include exemplary embodiments of the disclosed subject matter and illustrate various objects and features thereof.

DETAILED DESCRIPTION

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Figure 1:
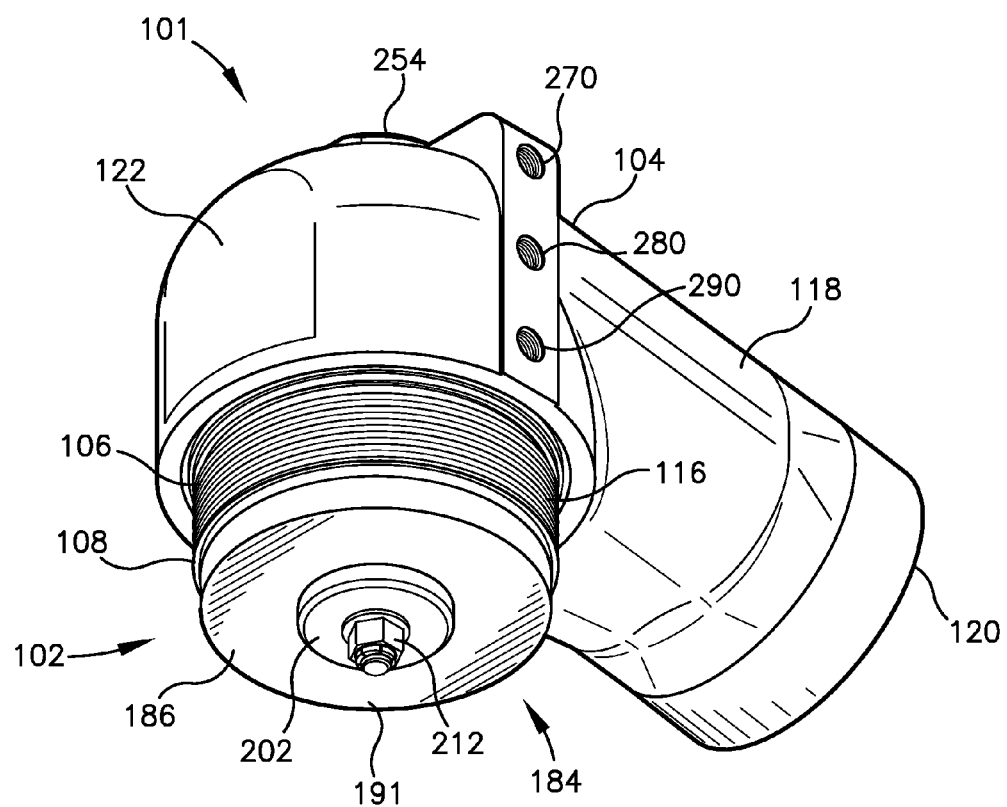
FIG. 1 is an isometric view from below of an embodiment of a vent with a two stage valve assembly in a closed position embodying principles of the disclosed subject matter.
Figure 2:
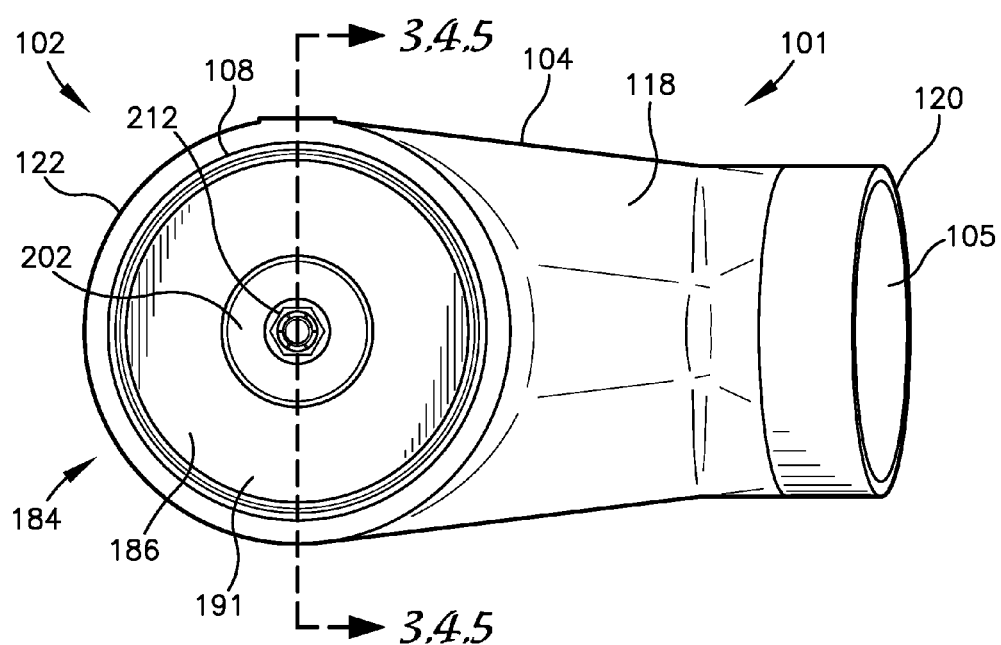
FIG. 2 is a bottom view of the two stage valve assembly.

Referring to the drawings, FIGS. 1-8 show an embodiment of a two stage valve assembly 102 embodying principles of the disclosed subject matter. Referring to FIG. 1, the valve assembly 102 is shown in use with a vent 101. The vent 101 generally includes a housing 104 manufactured from metal, including aluminum or steel. The housing 104 is an angular tubular member with an inner wall 105 forming a passage between a first port 108 and a second port 120. The housing 104 includes a head 122 disposed between a neck 106 and a hood 118. The neck 106 is generally tubular and extends away from the head 122, terminating at the first port 108. The hood 118 extends away from the head 122, terminating at the second port 120. The vent 101 is mounted at the exterior of a container, including a tank (not shown) such as a material cargo tank for hauling volatile liquids with the neck 106 threadably received within the circular outlet of the container thereby providing a passage between the container and the second port 120 for venting the vapor that has accumulated within the container. The vapor within the container is prevented from exiting the container through the outlet by a valve assembly 102 sealing the first port 108.

Figure 3:
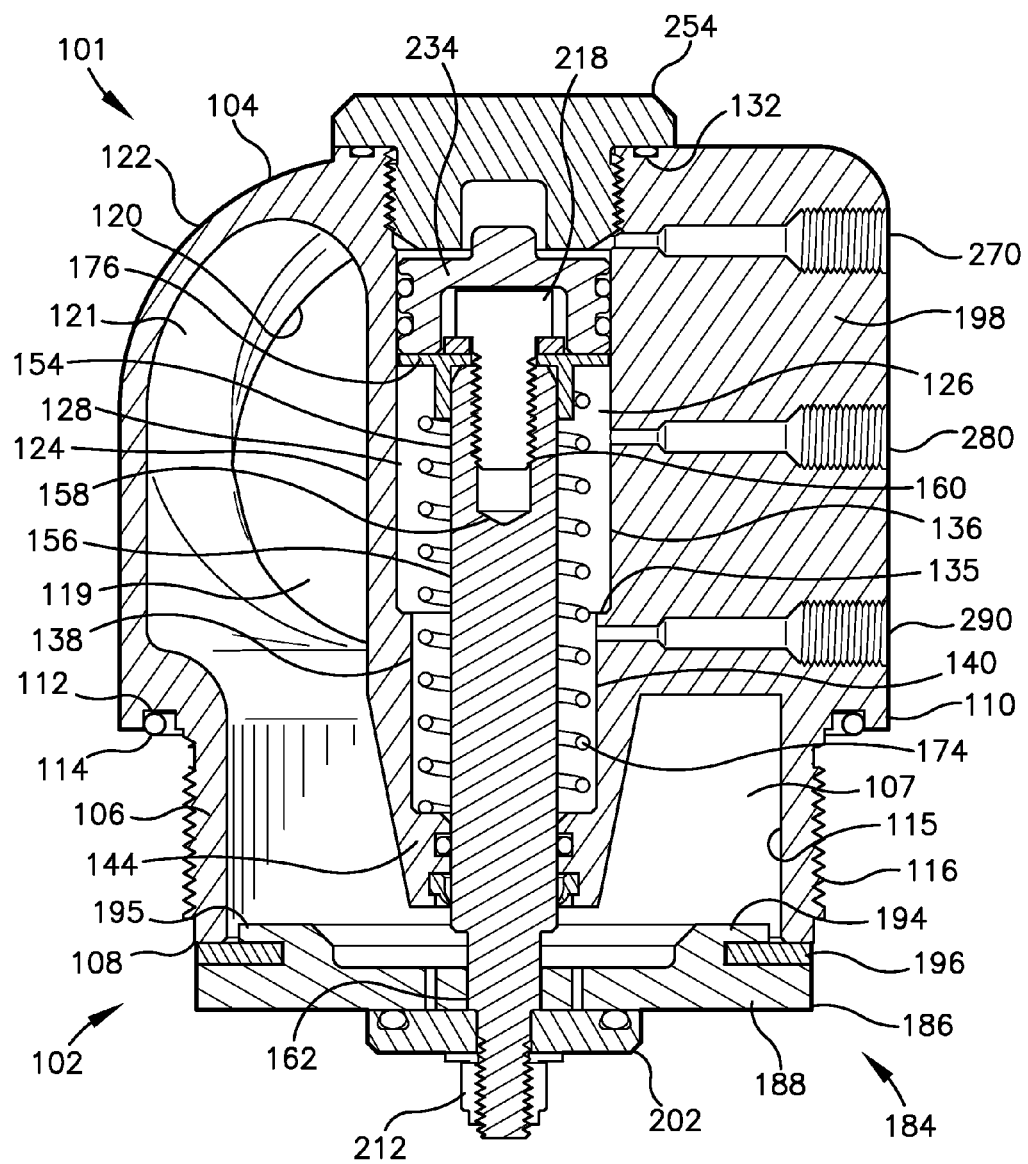
FIG. 3 is a cross section view of the two stage valve assembly in the closed position taken generally along line 3-3 in FIG. 2.
Figure 4:
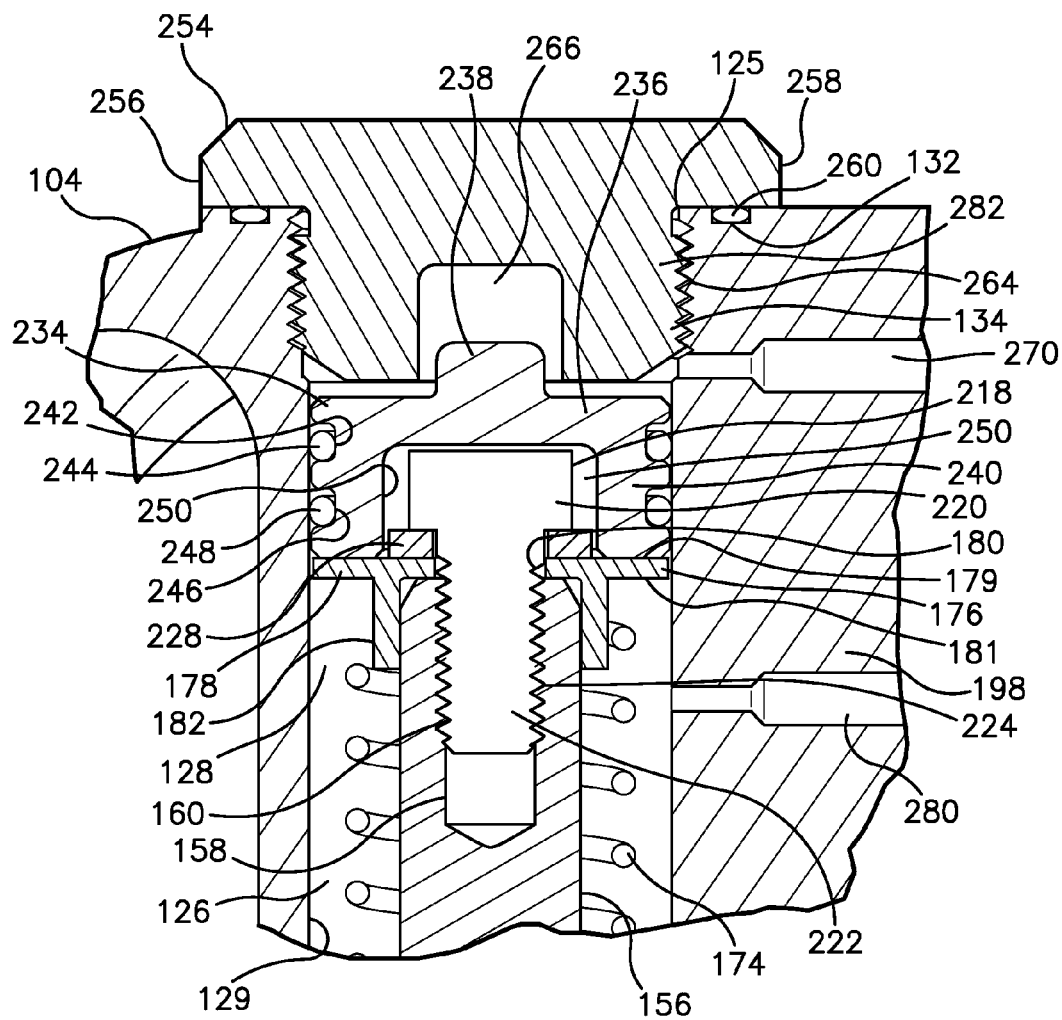
FIG. 4 is an enlarged view of the upper portion of the valve assembly taken generally within circle 4 in FIG. 3.
Figure 5:
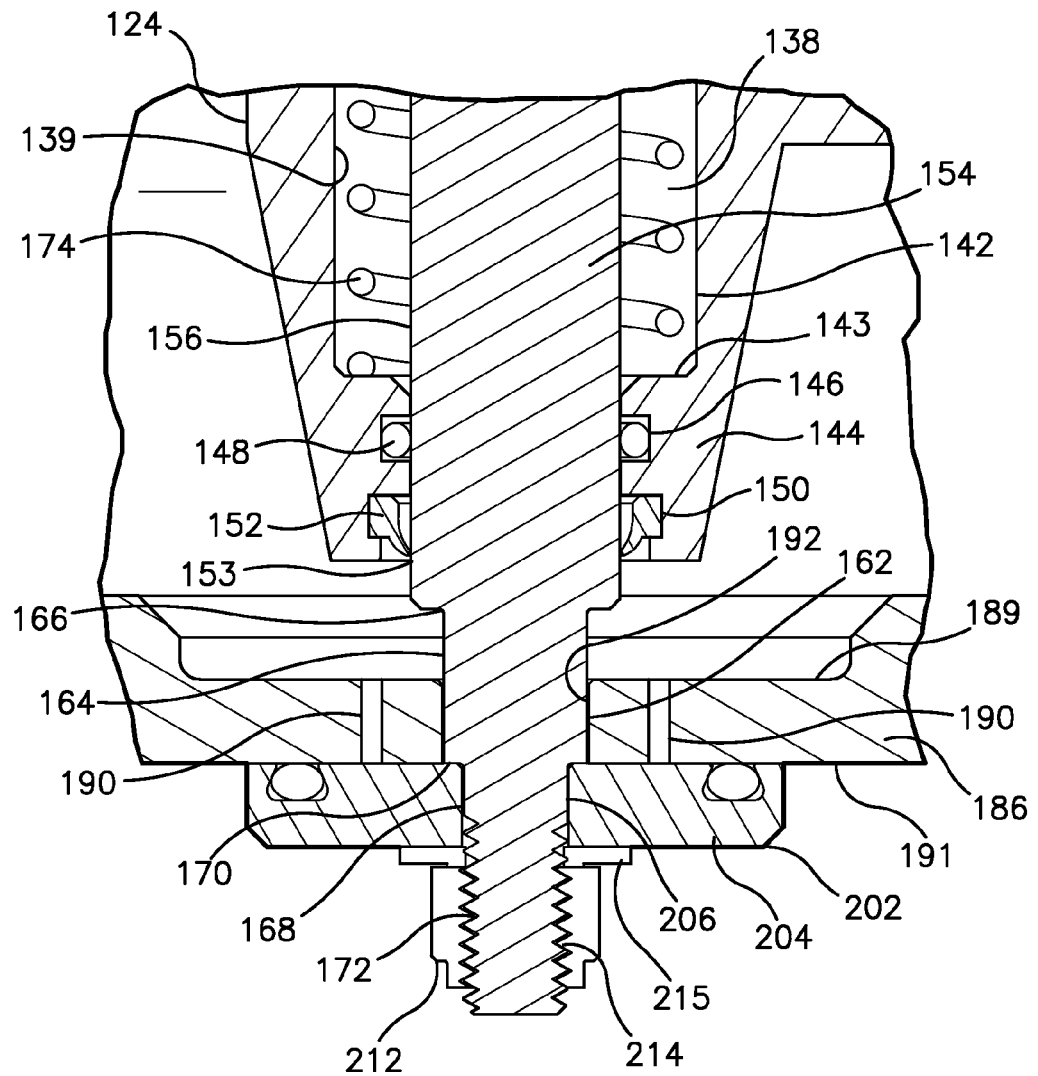
FIG. 5 is an enlarged view of the lower portion of the valve assembly taken generally within circle 5 in FIG. 3.
Figure 6:
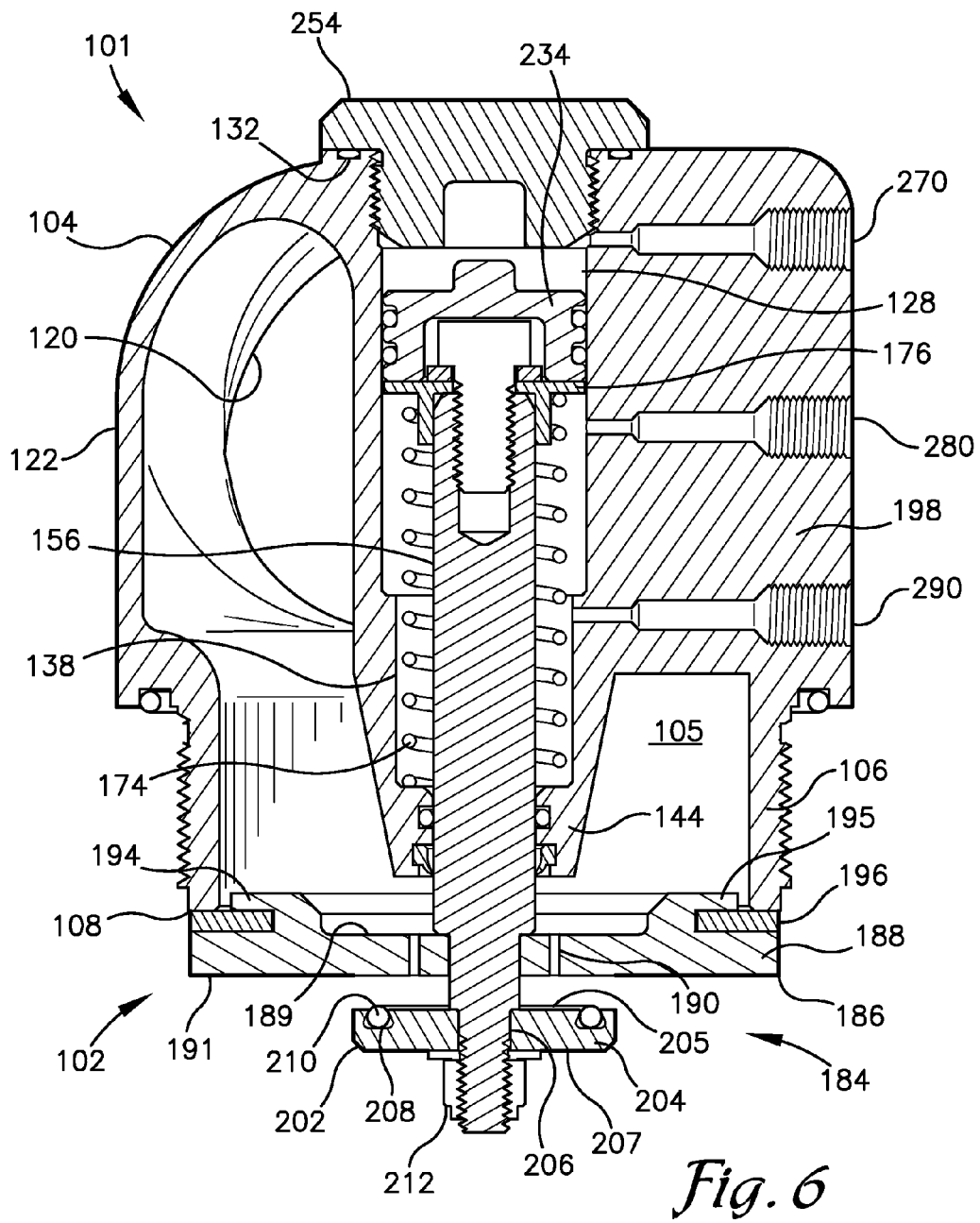
FIG. 6 is a cross section view of the two stage valve assembly in the first open position.
Figure 7:
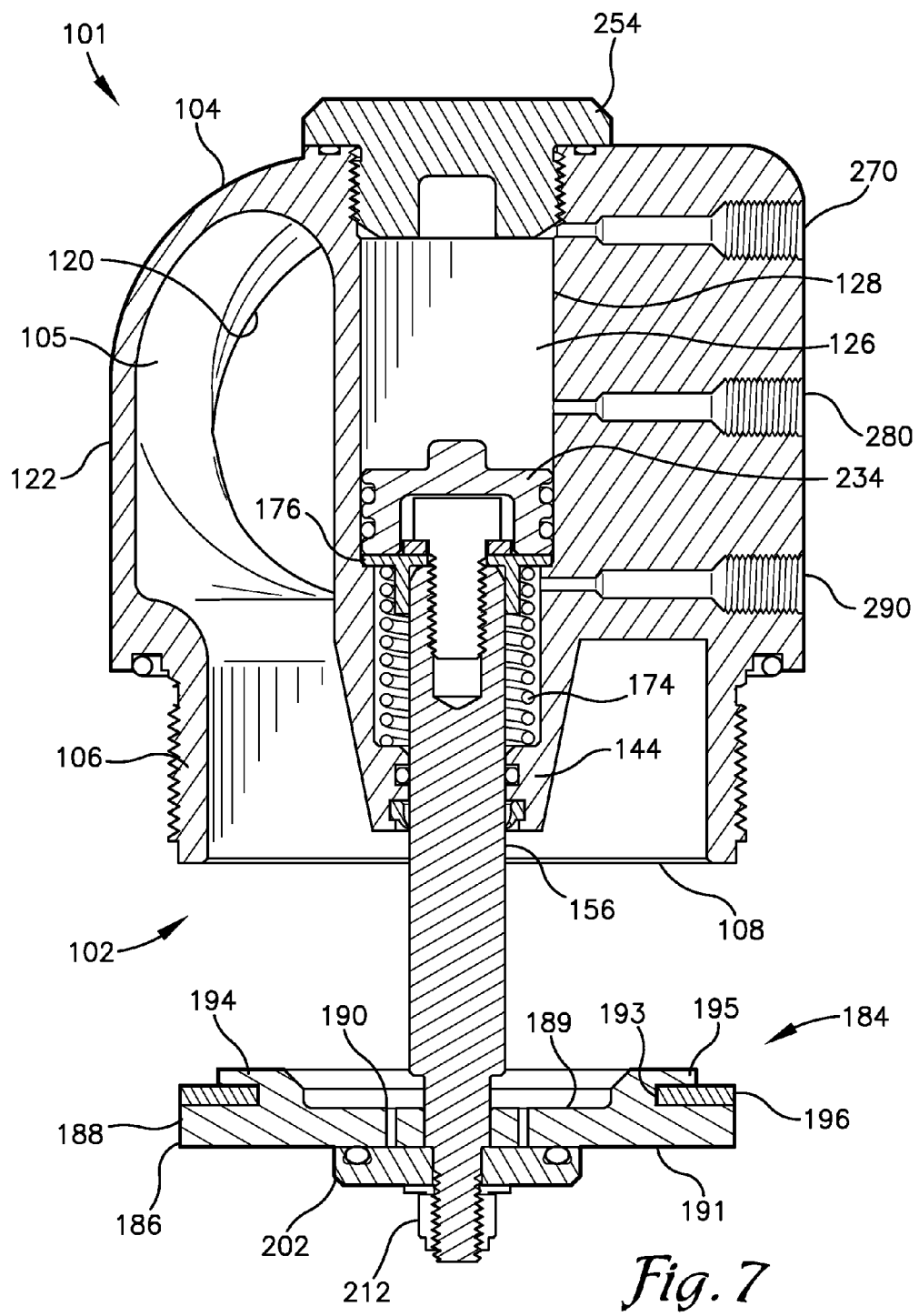
FIG. 7 is a cross section view of the two stage valve assembly in the second open position.
Figure 8:
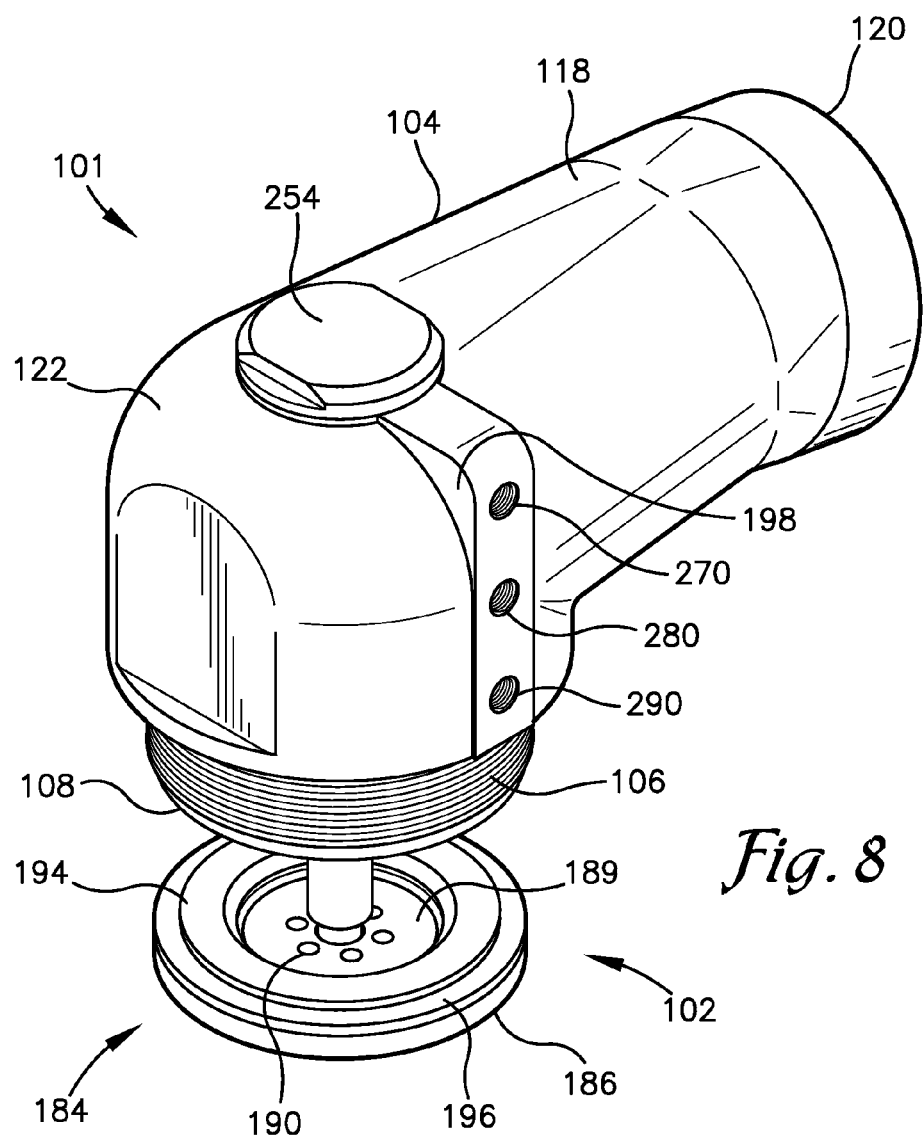
FIG. 8 is an isometric view of the two stage valve assembly in the second open position.

Referring to FIGS. 3-5, an embodiment of the valve assembly 102 is shown in a closed position with a sealing assembly 184 that includes a primary sealing member 186 and secondary sealing member 202 sealing the first port 108 thereby blocking the flow of vapor from the container through the housing 104. The pressure within the container from the accumulated vapor generates a force on the primary sealing member 186 and secondary sealing member 202 that may exceed the force available to disengage only the primary sealing member 186 to vent the container. The valve assembly 102 of the disclosed subject matter includes a secondary sealing member 202 sealing the primary sealing member 186 wherein the secondary sealing member 202 has less surface area in contact with the contents of the container than the primary sealing member 186. The smaller surface are of the secondary sealing member 202 requires less force to open against a high container pressure, thereby allowing the secondary sealing member 202 to open first to relieve pressure within the container and allow the primary sealing member 186 to subsequently open allowing for maximum venting of the container.

The neck 106 includes an upright passage 107 bound by a side wall 115 having external threads 116 adapted to cooperate with the internal threads on the container port. A flange 110 at the exterior of the housing 104 between the head 122 and neck 106 includes a downwardly open annular groove 112. The groove 112 receives a seal 114, including an O-ring, for providing a sealing relationship between the vent 101 and the container. Optionally, an annular locking ring with internal threads may be threadably secured to the lower portion of the neck 106 to further secure the wall of the container between the seal 114 and the locking ring. The hood 118 includes a horizontal passage 119 bound by a sidewall 121 for venting the contents of the container.

The valve assembly 102 generally includes an elongated tubular valve body 154 partially disposed within a tubular valve stem 124, with the primary sealing member 186 and the secondary sealing member 202 connected to a lower portion 168 of the valve body 154.

The valve stem 124 has an elongated tubular body with a passage 126 extending between a first opening 125 at the head 122 and a second opening 153 adjacent the first port 108. A support member 198 extends between the valve stem 124 and the head 122 providing ports 270, 280, and 290 that communicate with the passage 126. The passage 126 includes an upper cylindrical chamber 128 having an inner wall 129 extending between the first opening 125 at an upper end 130 and a first shoulder 135 at a lower end 136 for slidably receiving a piston 234. An upwardly open annular groove 132 in the housing 104 circumscribes the first opening 125 for accommodating an annular seal 260.

A cap 254 seals the first opening 125. The cap 254 includes a head 256 with an annular flange 258 extending outward therefrom. A cylindrical neck 282 extends downward from the head 256 and includes exterior threads 264 for engaging threads 134 in the inner wall 129 adjacent the first opening 125. The bottom surface of the flange 258 creates a sealing relationship between the cap 254 and the housing 104 as the cap 254 is secured within the valve stem 124.

A lower cylindrical chamber 138, having a diameter less than the diameter of the upper chamber 128, has an inner wall 139 and extends between the first shoulder 135 at an upper end 140 and a second shoulder 143 at a lower end 142. A guide assembly 144 adjacent the second opening 153 extends between the second shoulder 143 and the second opening 153. The guide assembly 144 includes an inwardly open upper annular groove 146 adjacent the second shoulder 143 for accommodating an annular seal 148, including an O-ring, for creating a slidable sealing relationship between the valve stem 124 and the valve body 154. An inwardly open lower annual groove 150 is disposed between the upper annular groove 146 and the second opening 153 for accommodating an annular seal 152, including a wiper seal, to further create a slidable sealing relationship between the valve stem 124 and the valve body 154. The valve body 154 is slidably received within the valve stem 124 by seals 148 and 152.

The valve body 154 includes an upper body 156 disposed within the valve stem 125, and a lower body 162. An upwardly open tubular receiver 158 within the upper body 156 includes internal threads 160 for receiving a retaining member 218, discussed in more detail below. The lower body 162 includes an upper portion 164 and a lower portion 168. The upper portion 164 extends downward from the upper body 156 and has a cross-sectional diameter less than the cross-sectional diameter of the upper body 156, with the transition between the upper body 156 and the upper portion 164 forming a first shoulder 166. The lower portion 168 extends downward from the upper portion 164 and has a diameter less than the diameter of the upper portion 164, with the transition between the upper portion 164 and the lower portion 168 forming a second shoulder 170. The lower portion 168 includes an externally threaded section 172 for receiving a threaded member 212, described in more detail below.

The primary sealing member 186 includes a disk-shaped body 188 with an upper surface 189 and lower surface 191. A centrally located passage 192 passes between the upper surface 189 and lower surface 191 for slidably mounting the primary sealing member 186 on the upper portion 164. The passage 192 is shown as a circular opening. In an alternative embodiment, the passage 192 may be an oblong opening to accommodate a complimentary upper portion 164. A circular array of apertures 190 around the passage 192 pass between the upper surface 189 and lower surface 191 and work in cooperation with the secondary sealing member 202 described in more detail below. A seal 196 disposed at the upper surface 189 creates a sealing relationship between the primary sealing member 186 and the first port 108. In an embodiment, the primary sealing member 186 may include a flange 194 on the upper surface 189 having an annular outward extending lip 195 forming an outward annular cavity 193 between the lip 195 and upper surface 189 for receiving the seal 196.

The secondary sealing member 202 includes a disk-shaped body 204 with an upper surface 205 and a lower surface 207.

In the embodiment shown in FIGS. 1-8, the body 204 is generally disk-shaped. In alternative embodiments the body 204 is noncircular. A centrally located passage 206 passes between the upper surface 205 and lower surface 207 for mounting the secondary sealing member 202 on the lower portion 168. The passage 206 is shown as a circular opening. In an alternative embodiment, the passage 206 may be an oblong opening to accommodate a complimentary lower portion 168. An upwardly-open annular groove 208 in the upper surface 205 is disposed between the passage 206 and outer edge of the body 204. The groove 208 receives a seal 210, including an O-ring, for creating a sealing relationship between the secondary sealing member 202 and the lower surface 191 of the primary sealing member 186. The apertures 190 in the primary sealing member are arranged to fall within the area sealed by the seal 210. A threaded member 212 includes internal threads 214 that cooperate with the threaded section 172 on the valve body 154 for retaining the secondary sealing member 202 on the valve body 154. Optionally, a sealing member 215, including a seal, a flat washer, or a lock washer may be disposed between the threaded member 212 and the secondary sealing member 202 to further secure the secondary sealing member 202 to the valve body 154.

A helical spring 174 is retained within the valve stem 124 around the valve body 154 and between the shoulder 143 and a spring guide 176 for biasing the secondary sealing member 202 against the primary sealing member 186, and the primary sealing member 186 against the first port 108. The spring guide 176 has a cylindrical neck 182 extending downward from an outwardly directed annular flange 178. The flange 178 includes a top surface 179 and a bottom surface 181, and extends outward terminating adjacent to the inner wall 129 of the upper chamber 128. The neck 182 extends downward along the upper body 156. A passage 180 extends between the top surface 179 and bottom surface 181 allowing the guide 176 to be secured to the top of the vale body 154 by the retaining member 218. The bottom surface 181 serves as a biasing surface for the spring 174. The retaining member 218 includes a head 220 and a cylindrical neck 222 extending therefrom having external threads 224 that cooperate with the internal threads 160 in the valve body 154 for securing the guide 176 to the valve body 154. A washer 228 with a passage 230 may optionally reside between the retaining member 218 and guide 176.

The piston 234 resides within the upper chamber 128 between the cap 254 and the guide 176, and includes a cylindrical side wall 240 extending downward from a top wall 236. A projection 238 extends upward from the top wall 236 for facilitating removal of the piston 234 from the upper chamber 128, and may reside within a cavity 266 in the cap 254 when the sealing assembly 184 is in the sealed relationship. The side wall 240 includes an outwardly open first annular groove 242 disposed above an outwardly open second annular groove 246. The annular grooves 242, 246 are adapted for accommodating an annular seal 244, 246, respectively, including an O-ring, thereby creating a slidable sealing relationship between the piston 234 and the inner wall 129. A central, downwardly open cavity 250 bound by the top wall 236 and the side wall 240 provides a space for the retaining member 218 head 220 to reside as the bottom edge of the side wall 240 contacts the flange 178 top surface 179.

A manifold (not shown) supplies a gas or liquid, preferably gas, from a reservoir to the ports 270, 280, and 290 allowing the gas to accumulate within the upper cylindrical chamber 128 thereby generating pressure within the upper cylindrical chamber 128 forcing the piston 234 and valve body 154 downward. Gas enters the upper cylindrical chamber 128 above the piston 234 through first port 270 and exits the space below the piston 234 and the second shoulder 143 through the third port 290. As the air gathers within the valve stem 124 above the piston 234 the pressure within this chamber generates a downward force on the piston 234 causing it to bias against the upward force of the spring 174 thereby compressing the spring 174 and unsealing the primary sealing member 186 and secondary sealing member 202.

Referring to FIGS. 3-7, as the piston 234 moves downward, the second shoulder 170 biases against the upper surface 205 of the secondary sealing member 202, and the secondary sealing member 202 is biased against the interior container pressure. As the piston 234 moves downward the sealing relationship between the secondary sealing member 202 and the lower surface 191 of the primary sealing member 186 is broken allowing vapor to pass from the container, through the apertures 190 within the primary sealing member 186 into the passage 107 and out of the vent 101 through the second port 120. This initial release of vapor from the container lowers the overall pressure within the container allowing the subsequent opening of the primary sealing member 186 and complete venting of the container. As the piston 234 continues to move downward, the first shoulder 166 biases against the upper surface 189 of the primary sealing member 186, and the primary sealing member 186 is biased against the remaining container pressure thereby breaking the sealing relationship between the primary sealing member 202 and the first port 108 and allowing the container to completely vent.

The above steps operate in reverse whereby the spring 174 biases against the guide 176 causing the sealing assembly 184 to seal the first port 108.

Although the invention has been disclosed with reference to various particular embodiments, it is understood that equivalents may be employed and substitutions made herein without departing from the scope of the invention as recited in the claims.

Having thus described the disclosed subject matter, what is claimed is:

1. A valve assembly, comprising:
  (1) a housing extending between a lower first port and an upper second port;
  (2) a valve body extending into the housing, comprising:
    (a) an upper body having a cross sectional diameter, wherein the upper body is disposed within the housing;
    (b) and a lower body, comprising:
      (i) an upper portion extending downward from the upper body and having a cross sectional diameter less than the upper body; and
      (ii) a lower portion extending downward from the upper portion and having a cross sectional diameter less than the upper portion; and
  (3) a sealing assembly, comprising:
    (a) a primary sealing member, comprising:
      (i) a body including an upper surface and a lower surface;
      (ii) a passage for slidably mounting the primary sealing member to the upper portion;
      (iii) an aperture adjacent the passage, the aperture extending between the upper surface and the lower surface; and
      (iv) a seal at the upper surface for creating a sealing relationship between the primary sealing member and the housing first port; and
    (b) a secondary sealing member, comprising:
      (i) a body including an upper surface and an outer edge;
      (ii) a passage for mounting the secondary sealing member to the lower portion;

(iii) a groove in the upper surface disposed between the passage and outer edge; and
(iv) a seal received within the groove for creating a sealing relationship between the secondary sealing member and the primary sealing member lower surface, wherein when the secondary sealing member and primary sealing member are in a sealing relationship the aperture of the primary sealing member falls within the region defined by the second sealing member passage and the second sealing member seal.

2. The valve assembly of claim 1, further comprising:
a tubular valve stem disposed within the housing, the valve stem extending between a first opening and a second opening adjacent the first port; and
wherein the upper body of the valve body is slidably received within the valve stem.

3. The valve assembly of claim 1, wherein:
the housing is tubular; and
the primary sealing member body is disk-shaped.

4. The valve assembly of claim 3 wherein the primary sealing member includes a plurality of apertures around the passage.

5. The valve assembly of claim 1, wherein the lower body of the valve body further comprises:
a first shoulder formed by the transition between the upper body and the upper portion; and
wherein the first shoulder biases against the primary sealing member upper surface when the valve body moves downward.

6. The valve assembly of claim 2, further comprising:
a spring guide secured to the top of the upper end of the valve body and including an outwardly directed annular flange;
a helical spring retained within the valve stem around the valve body;
wherein the helical spring biases upward against the annular flange biasing the secondary sealing member against the primary sealing member, and the primary sealing member against the first port;
wherein the valve assembly includes an upper cylindrical chamber having an inner wall;
a piston disposed within the upper cylindrical chamber, between the spring guide and the valve stem first opening, wherein the piston comprises:
a top wall;
a cylindrical side wall extending downward from a top wall;
an outwardly open first annular groove within the side wall;
an annular seal received within the first annular groove for creating a sealing relationship between the piston and the inner wall; and
wherein air forcibly entering the upper cylindrical chamber moves the piston downward moving the valve body downward, and biasing the spring guide against the spring, thereby sequentially moving the secondary sealing member downward and away from the primary sealing member, and then moving the primary sealing member downward and away from the first port.

7. A valve assembly, comprising:
(1) a tubular housing extending between a lower first port and an upper second port;
(2) a tubular valve stem disposed within the housing, the valve stem extending between a first opening and a second opening adjacent the first port;
(3) an elongated tubular valve body, comprising:
(a) an upper body having a cross sectional diameter, wherein the upper body is disposed within the valve stem; and
(b) and a lower body, comprising:
(i) an upper portion extending downward from the upper body and having a cross sectional diameter less than the upper body; and
(ii) a lower portion extending downward from the upper portion and having a cross sectional diameter less than the upper portion; and
(4) a sealing assembly, comprising:
(a) a primary sealing member, comprising:
(i) a disk-shaped body including an upper surface and a lower surface;
(ii) a centrally located passage for slidably mounting the primary sealing member to the upper portion;
(iii) an aperture adjacent the passage, the aperture extending between the upper surface and the lower surface; and
(iv) a seal at the upper surface for creating a sealing relationship between the primary sealing member and the tubular housing first port; and
(b) a secondary sealing member, comprising:
(i) a body including an upper surface and an outer edge;
(ii) a centrally located passage for mounting the secondary sealing member to the lower portion;
(iii) a groove in the upper surface disposed between the passage and outer edge; and
(iv) a seal received within the groove for creating a sealing relationship between the secondary sealing member and the primary sealing member lower surface, wherein when the secondary sealing member and primary sealing member are in a sealed relationship the aperture of the primary sealing member falls within the region defined by the second sealing member passage and the second sealing member seal.

8. The valve assembly of claim 7, wherein the lower body of the valve body further comprises:
a first shoulder formed by the transition between the upper body and the upper portion; and
wherein the first shoulder biases against the primary sealing member upper surface when the valve body moves downward.

9. The valve assembly of claim 7, further comprising:
an externally threaded section on the lower portion; and
an internally threaded member, wherein the internally threaded member is received on the threaded section for securing the secondary sealing member to the lower portion.

10. The valve assembly of claim 7, wherein the primary sealing member includes an array of apertures around the passage.

11. The valve assembly of Claim 7, wherein the second sealing member is disk-shaped.

12. The valve assembly of claim 7, further comprising:
a spring guide secured to the top of the upper end of the valve body and including an outwardly directed annular flange;
a helical spring retained within the valve stem around the valve body; and
wherein the helical spring biases upward against the annular flange biasing the secondary sealing member against the primary sealing member, and the primary sealing member against the first port.

13. The valve assembly of claim 12, wherein:
the valve assembly includes an upper cylindrical chamber having an inner wall;

a piston disposed within the upper cylindrical chamber, between the spring guide and the valve stem first opening, wherein the piston comprises:

a top wall;

a cylindrical side wall extending downward from a top wall;

an outwardly open first annular groove within the side wall;

an annular seal received within the first annular groove for creating a slidable sealing relationship between the piston and the inner wall; and wherein air forcibly entering the upper cylindrical chamber moves the piston downward moving the valve body downward, and biasing the spring guide against the spring, thereby sequentially moving the secondary sealing member downward and away from the primary sealing member, and then moving the primary sealing member downward and away from the first port.

14. A valve assembly, comprising:
(1) a tubular housing extending between a lower first port and an upper second port;
(2) a tubular valve stem disposed within the housing, the valve stem extending between a first opening and a second opening adjacent the first port;
(3) an elongated valve body, comprising:
   (a) a tubular upper body having a cross sectional diameter, wherein the upper body is disposed within the valve stem; and
   (b) and a lower body, comprising:
   (i) a tubular upper portion extending downward from the upper body and having a cross sectional diameter less than the upper body;
   (ii) a first shoulder formed by the transition between the upper body and the upper portion;
   (iii) a tubular lower portion extending downward from the upper portion and having a cross sectional diameter less than the upper portion; and
   (iv) a second shoulder formed by the transition between the upper portion and the lower portion; and (4) a sealing assembly, comprising:
   (a) a primary sealing member, comprising:
   (i) a disk-shaped body including an upper surface and a lower surface;
   (ii) a centrally located passage for slidably mounting the primary sealing member to the upper portion;
   (iii) an aperture adjacent the passage, the aperture extending between the upper surface and the lower surface;
   (iv) a flange at the upper surface including an annular outward extending lip forming an outward annular cavity; and
   (v) a seal extending from the annular cavity creating a sealing relationship between the primary sealing member and the tubular housing first port; and
   (b) a secondary sealing member, comprising:
   (i) a body including an upper surface;
   (ii) a centrally located passage for mounting the secondary sealing member to the lower portion; and
   (iii) a seal at the upper surface for creating a sealing relationship between the secondary sealing member and the primary sealing member lower surface, wherein when the secondary sealing member and primary sealing member are in a sealed relationship the aperture of the primary sealing member falls within the region defined by the second sealing member passage and the second sealing member seal.

15. The valve assembly of claim 14, wherein the first shoulder biases against the primary sealing member upper surface when the valve body moves downward.

16. The valve assembly of claim 14, wherein:
the centrally located passage of the primary sealing member is an oblong opening; and
the upper portion includes an oblong cross section that compliments the oblong opening of the primary sealing member.

17. The valve assembly of claim 14, wherein the primary sealing member includes an array of apertures around the passage.

* * * * *